United States Patent Office 3,452,659
Patented July 1, 1969

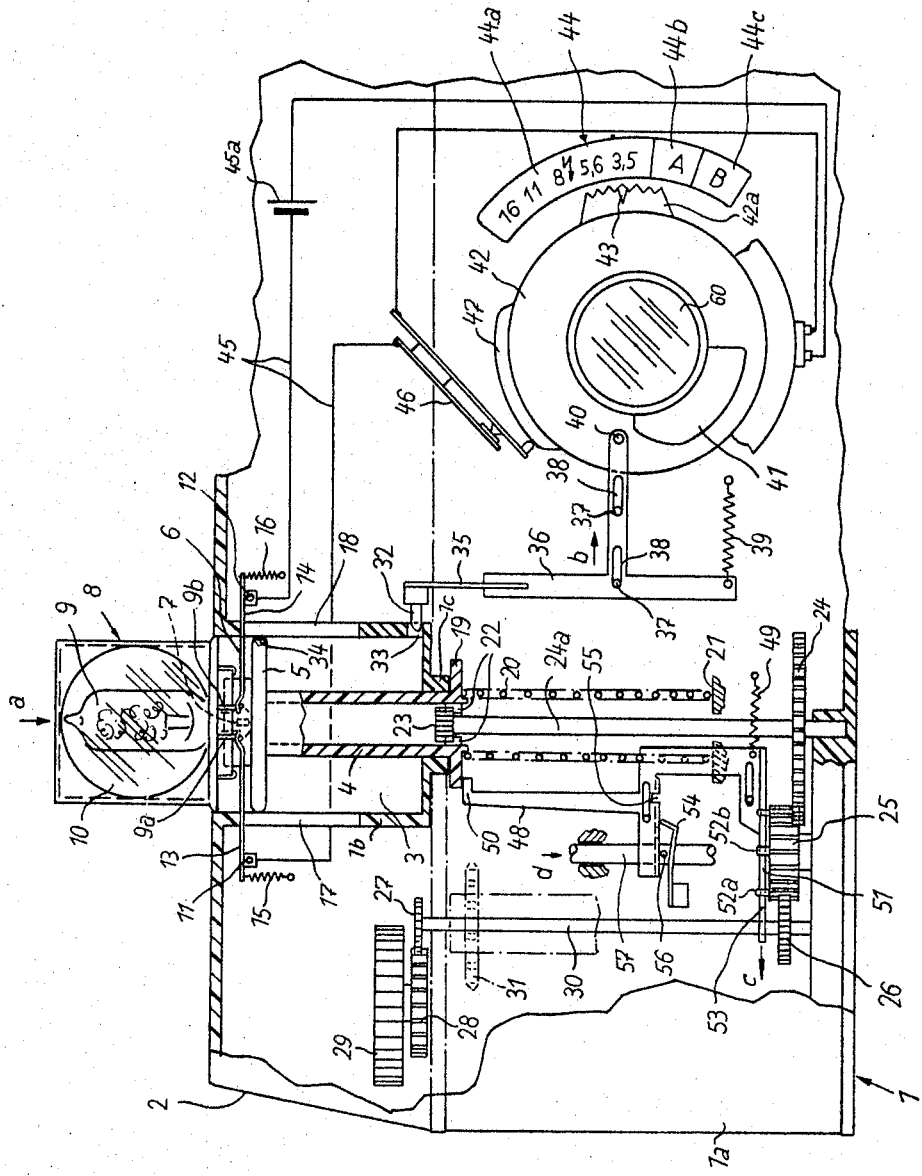

3,452,659
CAMERA WITH PHOTOFLASH UNIT
Joachim von Albedyll and Fridolin Hennig, Munich, Germany, assignors to Agfa-Gevaert Aktiengesellschaft, Leverkusen, Germany
Filed Aug. 3, 1966, Ser. No. 569,884
Claims priority, application Germany, Aug. 3, 1965,
A 49,906
Int. Cl. G03b 9/70
U.S. Cl. 95—11.5                    19 Claims

ABSTRACT OF THE DISCLOSURE

A still camera wherein the housing is provided with a recess for a reciprocable and indexable socket which can be attached to a multiple flash bulb holder. The socket can be indexed by the film transporting mechanism when it is moved to extended position and is automatically disengaged from the film transporting mechanism and locked in retracted position when the camera is set for operation in daylight.

---

The present invention relates to photographic cameras in general, and more particularly to improvements in cameras which are provided with built-in photoflash units. Still more particularly, the invention relates to cameras whose photoflash units can utilize multiple flash bulb holders, especially those known as "Flashcubes" wherein four equidistant flash bulbs can be moved seriatim to requisite position for making an exposure with flash in response to repeated rotation of their holder through angles of 90 degrees.

It is already known to provide the photoflash unit of a camera with a rotary coupling member or socket which can receive the plug of a conventional multiple flash bulb holder and which can be rotated by hand or by the film transporting mechanism to place successive flash bulbs into requisite position for operation with flash. A serious drawback of such cameras is that their housing must be separated from the multiple flash bulb holder when the user decides to place his camera into a customary case which, as a rule, is not dimensioned in such a way that it could accommodate the holder. In other words, and unless the user is willing to incur the expense of ordering a specially built case for his camera, the multiple flash bulb holder must be detached prior to insertion of the camera into its normal carrying case.

Accordingly, it is an important object of the present invention to provide a photographic camera whose built-in photoflash unit can utilize readily available multiple flash bulb holders and which is constructed and assembled in such a way that the holder need not be detached when the user decides to introduce the camera into a customary carrying case of the type which affords no room for a multiple flash bulb holder if the holder extends beyond the outlines of the camera housing.

Another object of the invention is to provide a camera whose housing can conceal a multiple flash bulb holder.

A further object of the invention is to provide a camera of the just outlined characteristics wherein the concealment of a multiple flash bulb holder can take place only when the operator has placed an unexpended flash bulb of the holder into an optimum position for operation with flash.

An additional object of the instant invention is to provide a photographic camera wherein the flash circuit can be completed only when a multiple flash bulb holder which is connected to the socket of the built-in photoflash unit is fully exposed and when an unexpended flash bulb is ready to be ignited in the course of the next exposure with flash.

Still another object of the invention is to provide a novel indexing mechanism for a detachable multiple flash bulb holder which may be utilized in a camera of the above outlined characteristics.

A concomitant object of the invention is to provide a novel operative connection between the just mentioned indexing mechanism and the film transporting and/or shutter cocking mechanism of a still camera.

Another object of our invention is to provide a photographic camera of the above outlined characteristics and to equip the camera with one, two or more safety devices which will prevent the user from trying to make an exposure with flash except when the exposure control of the camera is set for such operation, when a holder which is attached to its socket is fully exposed, and when the properly connected holder is oriented in such a way that an unexpended flash bulb faces the subject.

A further object of the invention is to provide a still camera wherein the multiple flash bulb holder can be concealed only when the operator has manipulated the film transporting mechanism to move the freshly exposed film frame away from registry with the aperture of the diaphragm.

Briefly stated, one feature of our present invention resides in the provision of a photographic camera, preferably a still camera, which comprises a housing defining an internal chamber having an open side which is preferably located in the topmost wall of the housing, an indexing mechanism including a rotary coupling member adapted to be connected with a "Flashcube" or an analogous multiple flash bulb holder and being located in the internal chamber and being movable therein axially between first and second positions in one of which a holder connected thereto extends from the chamber and in the other of which the holder is retracted into the chamber, and drive means for rotating the coupling member through successive angles of equal magnitude when the coupling member is moved to the one position in which the holder is exposed. The drive means is preferably constituted by a film transporting and/or shutter cocking mechanism, i.e., by a mechanism which is arranged to perform another function incidental to normal manipulation of the camera between successive exposures. The indexing mechanism preferably comprises a suitable clutch which is inoperative when the coupling member is moved to the other position and which can rotate the coupling member in response to manipulation of the drive means when the coupling member is moved to such position in which the holder connected thereto is exposed. In other words, the operative connection between the indexing mechanism and the drive means therefor can be interrupted in automatic response to introduction of the holder into the internal chamber of the housing.

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of a specific embodiment with reference to the accompanying drawing.

The single figure of the drawing illustrates the improved photographic camera in front elevational view, portions of the housing and certain other components of the camera being broken away or shown in section.

Referring to the drawing in detail, there is shown a still camera having a housing 1 including a lower portion or support 1a and an upper portion or cover 2. The space between the top wall of the cover 2 and the top wall of the support 1a accommodates a series of camera components (not shown), such as a conventional view finder, an exposure meter and, if necessary, a range finder. This space further accommodates a casing 1b defining a chamber 3 which has an open upper side located in the top wall of the cover 2 and is dimensioned to accommodate a multiple flash bulb holder 8 here shown in the form of a "Flashcube" having four reflectors 10 each of which is located behind a flash bulb 9. By causing the holder 8 to rotate through angles of 90 degrees, the operator can place successive unexpended flash bulbs 9 into an optimum position for illumination of a subject. In such optimum position of a flash bulb 9, the axis of the respective reflector 10 preferably extends in parallelism with the optical axis of the objective 60. The holder 8 is shown in exposed or operative position in which it extends beyond the top wall of the cover 2 so that the flash bulbs 9 are exposed. By applying finger pressure in downward direction (arrow a), the user of the camera can move the holder 8 to a fully concealed position, i.e., into the chamber 3 so that the camera can be readily stored in a conventional case. In other words, there is no need to purchase a special case just because the operator might wish to leave the holder 8 attached to the housing 1.

The indexing mechanism for the holder 8 comprises a tubular carrier 4 which extends centrally through the chamber 3 when the holder 8 is moved to extended position. The upper end portion of the carrier 4 is rigid with a horizontal platform 5 which is provided with a female coupling member or socket 6 having its top face formed with a preferably cruciform recess for the male coupling member or plug 7 of the holder 8. The plug 7 is formed with one or more radially extending teeth.

Two vertical side walls of the casing 1b are formed with vertically extending slots 17, 18 for a pair of flexible contacts 13, 14 which are respectively turnable on horizontal pivots 11, 12 and are permanently biased by springs 15, 16. Each of the contacts 13, 14 resembles a two-armed lever the shorter arm of which is biased by the spring 15, 16 and the longer arm of which then extends substantially horizontally through the respective slot 17, 18 and into the upper portion of the chamber 3. The contacts 13, 14 are turned to move their longer arms downwardly and into the slots 17, 18 when the holder 8 is depressed and moves to its concealed or retracted position.

The lower end portion of the carrier 4 extends through the bottom wall of the casing 1b and carries an annular flange 19 which is biased by a helical spring 20 tending to move the carrier upwardly. The lowermost convolution of the spring 20 bears against a fixed retainer 21 provided in the interior of the support 1a. The spring 20 serves as a means for expelling the holder 8 from the chamber 3 and for maintaining the holder in the extended position which is shown in the drawing and in which the flange 19 abuts against a stationary stop 1c at the underside of the casing 1b.

The lower end portion of the carrier 4 is formed with an annulus of internal teeth 22 which constitute an internal gear and can be moved into mesh with a gear 23. The gears 22, 23 constitute two separable elements of a simple gear clutch which is operative only when the holder 8 is moved to extended position. The gear 23 is mounted at the upper end of a shaft 24a which is journalled in the interior of the support 1a and carries at its lower end a gear 24. The shaft 24a is rotatable in but cannot move axially with reference to the support 1a. The gear 24 forms part of a gear train which further includes gears 25 and 26. The heretofore described parts 4, 5, 6, 19, 22, 23, 24, 24a, 25, 26 together constitute an indexing mechanism for the plug 7 of the holder 8, and this indexing mechanism can be operated by a drive which is constituted by a film transporting mechanism including a shaft 30 whose lower end portion carries the aforementioned gear 26. The shaft 30 further carries a customary sprocket 31 whose teeth enter successive perforations in one marginal portion of the film, and a gear 27 which meshes with a gear 28 coaxially secured to a manually operable actuating member here shown as a knurled or milled wheel 29 a portion of which extends from the cover 2 and can be rotated by hand. If desired, the wheel 29 can be replaced by a lever or by another suitable actuating member. The ratio of the gear train 24, 25, 26 is such that the socket 6 (and hence the holder 8) is rotated through exactly 90 degrees in response to each manipulation of the film transporting mechanism 27-31 for the purpose of advancing the film by the length of a frame.

If the operator does not wish to make exposures with flash, or if the operator wishes to store the camera in a case which does not have a compartment capable of accommodating the holder 8 in extended position, the holder is simply depressed by hand (arrow a) so that it enters the chamber 3 and does not extend beyond the top wall of the cover 2. Such movement of the holder 8 causes the spring 20 to store energy because the flange 19 approaches the fixed retainer 21. At the same time, the aforementioned clutch 22, 23 is disengaged in a fully automatic way because the internal gear 22 moves downwardly and away from the gear 23 at the upper end of the shaft 24a. In other words, the driving connection between the wheel 29 and the socket 6 is interrupted in automatic response to movement of the holder 8 to retracted position. This is important because the chamber 3 is preferably dimensioned in such a way that it can accommodate the holder 8 but that the latter cannot rotate in retracted position.

The improved camera further comprises a locking or retaining device for automatically holding the holder 8 in retracted position. This locking device comprises a locking projection or pin 32 which extends into an aperture or hole 33 provided in the adjoining vertical side wall of the casing 1b. When the holder 8 is fully accommodated in the chamber 3, the locking pin 32 can be shifted in a direction to the left, as viewed in the drawing, and enters a notch 34 provided in the platform 5. The notch 34 then registers with the aperture 33. The means for moving the locking pin 32 into or from the notch 34 could include a separate manually operable member which would be shifted, turned or otherwise moved by hand whenever the operator would decide to move the holder 8 to or from retracted position. In other words, and if the locking pin 32 were permanently biased to its locking position in which its tip would project into the chamber 3, the aforementioned manually operable member would be utilized to withdraw the locking pin from the notch 34 prior to movement of the holder 8 to extended position. If the locking pin 32 were permanently biased to the idle position shown in the drawing, the manually operable member would be provided to move and to hold this pin in locking position as long as the holder 8 is to remain in retracted position.

In accordance with an advantageous feature of the present invention, the locking pin 32 may be shifted to unlocking or idle position by means of a spring 39 which acts upon a reciprocable motion transmitting member 36. This member 36 has an upwardly extending leaf spring 35 which is connected with the locking pin 32. Horizontal slots 38 in the motion transmitting member 36 receive fixed guide pins 37 which allow limited movement of the member 36 under and against the bias of the spring 39. The free end of a horizontal arm on the member 36 carries a follower pin 40 which can be engaged and shifted by a cam 41 provided on a rotary ring-shaped selector 42 which is coaxial with the objective 60. The spring 39 tends to shift the member 36 (and hence the locking pin 32) in the direction indicated by an arrow b so that, when the locking pin can follow the bias of the spring 39, its tip is retracted from the chamber 3 to release the platform 5 and the spring 20 then expands to automatically raise the holder 8 to fully extended or exposed position. Retention of the holder 8 in concealed position is possible only when the selector ring 42 assumes one of several positions in which the camera is set for operation in daylight, i.e., in which the flash circuit 45 of the photoflash unit cannot be completed in response to release of the shutter.

In the illustrated embodiment, the selector 42 is movable not into only one but into two different angular positions in each of which the camera is set to make exposures in daylight. This selector 42 carries a toothed projection 42a which can be engaged and turned by a finger and carries an index 43 which can be placed into registry with selected graduations on a fixed scale 44. When the index 43 registers with the graduation A on the section 44b of the scale 44, the camera is set for automatic selection of exposure valves in daylight and in a manner known per se and therefore not forming part of the present invention. When the index 43 registers with a graduation B on the section 44c of the scale 44, the camera is also set for operation in daylight but the shutter remains open as long as the operator presses upon the release trigger. By moving the index 43 into registry with one of the graduations on the section 44a of the scale 44, the operator sets the camera for operation with flash. In the illustrated embodiment, the graduations of the section 44a represent different sizes of the diaphragm aperture, i.e., the operator can selected at will any of several aperture sizes when the camera is to make exposures with flash.

When the angular position of the selector 42 is such that the camera is set for operation in daylight (namely, when the index 43 registers with the section 44b or 44c of the scale 44), the cam 41 bears against the follower 40 and maintains the motion transmitting member 36 in the left-hand end position against the opposition of the spring 39 so that the tip of the locking pin 32 extends into the interior of the chamber 3 and can retain the holder 8 in retracted position. The holder 8 can be moved to such retracted position prior or after movement of the locking pin 32 into the chamber 3. If the locking pin extends beyond the aperture 33 prior to depression of the holder 8, the operator must overcome the resistance of the leaf spring 35 which yields and then returns to unstressed position as soon as the tip of the locking pin 32 snaps into the notch 34. If the holder 8 is depressed first and the selector 42 is then rotated to shift the locking pin 32 into the notch 34, such entry of the locking pin takes place without any flexing of the leaf spring 35.

The manner in which the selector 42 can set the camera for automatic determination of exposure values (size of the diaphragm aperture and/or exposure time) or in which the selector 42 can set the camera for manual determination of exposure time is well known from the art of still cameras and need not be described here.

A very important advantage of the operative connection 35-41 between the locking pin 32 and selector 42 is that the holder 8 is automatically expelled to exposed position as soon as the camera is set for operation with flash, i.e., as soon as the index 43 on the selector register with a graduation on the section 44a of the scale 44. The spring 39 is then free to contract and to shift the motion transmitting member 36 in a direction to the right, as viewed in the drawing, so that the guide pins 37 abut against the left-hand surfaces in the respective slots 38 whereby the locking pin 32 is retracted from the chamber 3 and the spring 20 expands to propel the holder 8 upwardly. This means that the operator need not carry out a separate manipulation for the sole purpose of moving the holder 8 to exposed position because he knows that the holder is automatically exposed as soon as he sets the camera for operation with flash. On the other hand, and as fully described hereinabove, the holder 8 will automatically remain in concealed position if it is depressed at a time when the index 43 registers with the graduation A or B. Furthermore, by moving to concealed position, the holder 8 automatically opens the flash circuit 45 because the aforementioned contacts 13, 14 are tilted into the slots 17, 18 and remain in such slots as long as the holder remains in the chamber 3. When the holder 8 is moved to exposed position, the longer arms of the contacts 13, 14 automatically engage one pair of four pairs of contacts 9a, 9b provided on the holder 8, one pair for each of the four flash bulbs 9. The contacts 13, 14 will engage the contacts 9a, 9b of that flash bulb 9 which faces the subject, i.e., which is ready to be ignited in response to depression of the release trigger.

The flash circuit 45 further includes a normally open control switch 46 which constitutes a highly advantageous optional feature of our invention and can be closed by a trip or cam 47 on the selector 42 when the index 43 registers with a graduation of the scale section 44a. This control switch 46 prevents the user from making an exposure with flash when the selector 42 sets the camera for operation in daylight but the user forgets to depress the holder 8 into the chamber 3. The trip 47 then moves away from the flexible contact of the switch 46 and the latter opens automatically to prevent completion of the flash circuit 45 as long as the index 43 registers with the scale section 44b or 44c.

The camera further comprises means for preventing the user from making (or from trying to make) an exposure with flash when a spent flash bulb 9 faces the subject. Such means comprises a blocking device which prevents depression of the holder 8 into the chamber 3 until and unless the user has manipulated the actuating wheel 29 subsequent to completion of an exposure with flash to thereby place a fresh (unexpended) flash bulb 9 into an optimum position for illumination of the subject during the next exposure with flash. In other words, the blocking device will allow depression of the holder 8 only at a time when a fresh flash bulb 9 is properly oriented to illuminate the subject during the next exposure with flash. The blocking device comprises a blocking member 48 which is reciprocable in the support 1a and is permanently biased by a helical spring 49 which tends to move it in a direction to the right, as viewed in the drawing, whereby a stop lug 50 at the upper end of the blocking member extends into the pathway of the flange 19 on the carrier 4 and prevents depression of the holder 8. The horizontal lower arm of the blocking member 48 has a cutout or opening 51 which accommodates two motion transmitting projections or pins 52a, 52b extending upwardly from the gear 25 of the indexing mechanism. This gear 25 is rotated through full 180 degrees in response to each such manipulation of the actuating wheel 29 that the film is transported by the length of a frame. When the gear 25 rotates through first 90 degrees, i.e., through a first fraction of 180 degrees, one of its projections 52a, 52b engages an internal surface 53 of the blocking member 48 which bounds the left-hand end of the opening 51 and shifts the member 48 in a direction to the left as indicated by an arrow c. During the second 90 degrees, i.e., during the remaining fraction of 180 degrees, this projection 52a or 52b moves away from the internal surface 53 but the blocking member 48 cannot follow the bias of its spring 49 because its intermediate portion is provided with a recess 55 which then receives the pallet of a leaf spring 54 serving as a detent means to temporarily hold the blocking member against movement to blocking position. The spring 54 can be withdrawn from the recess 55 in response to depression of a trigger 57 to its shutter releasing position (arrow d). The trigger 57 carries a disengaging pin 56 which then bears against the leaf spring 54 and flexes the latter downwardly and away from the adjoining portion of the blocking member 48. As soon as the spring 54 is disengaged, the spring 49 is free to contract and returns the blocking member 48 to the blocking or operative position which is shown in the drawing. The release trigger 57 is further provided with a trip (not shown) which closes the customary synchronizing switch (not shown) in the flash circuit 45 so that the flash circuit is completed when the trigger 57 moves in the direction of the arrow d. Of course, the flash circuit 45 can be completed only when the trip 47 of the selector 42 closes the control switch 46 (which is connected in parallel with the synchronizing switch) and when the gap between the contacts 13, 14 is bridged by two contacts 9a, 9b and the respective flash bulb 9. The circuit 45 further comprises a battery 45a or another suitable source of electrical energy.

The aforementioned feature that the projection 52a or 52b (whichever happens to engage the internal surface 53 of the blocking member 48 in response to the first stage of rotation of the actuating wheel 29) moves away from such internal surface prior to completed advance of the film enables the spring 49 to contract in response to depression of the release trigger 57.

Instead of being movable from blocking position by the gear 25 (i.e., in response to manipulation of the film transporting mechanism), the blocking member 48 may be moved by the cocking mechanism (not shown) for the shutter. All that counts is to provide a blocking member which will be effective to prevent depression of the holder 8 into the chamber 3 prior to indexing of the holder to place a fresh flash bulb 9 (if a fresh flash bulb is available) into proper position for making the next exposure with flash. In the illustrated embodiment, the blocking member 48 moves its stop lug 50 away from the path of the flange 19 in automatic response to manipulation of the film transporting mechanism. If the blocking member 48 is movable by the shutter cocking mechanism, the end result is often the same because many presently known cameras comprise means for preventing cocking of the shutter prior to manipulation of the film transporting mechanism.

In order to replace a spent holder 8 with a fresh holder, the user moves the index 43 into registry with a graduation on the section 44a and then exerts a pull to separate the plug 7 from the socket 6.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a photographic camera, a housing defining an internal chamber having an open side; an indexing mechanism including a rotary coupling member adapted to be connected with a multiple flash bulb holder, said coupling member being located in said chamber and being movable axially between first and second positions in one of which a holder connected to said coupling member extends from said chamber and in the other of which the holder is retracted into said chamber; and drive means for rotating said coupling member through angles of predetermined magnitude to thereby place successive flash bulbs of a holder which is connected with said coupling member into an optimum angular position, said indexing mechanism further including a clutch comprising a first rotary clutch element operatively connected with said coupling member and a second rotary clutch element receiving motion from said drive means, said first clutch element engaging said second clutch element in said one position of said coupling member and being disengaged from said second clutch element in response to movement of said coupling member to said other position so that said coupling member can be rotated by said drive means only when moved to said one position.

2. A structure as set forth in claim 1, wherein said first clutch element comprises an elongated tubular carrier coaxially secured to said coupling member and having an internal gear, said second clutch element comprising a second gear rotatably mounted in said housing and meshing with said internal gear is said one position of said coupling member.

3. A structure as set forth in claim 1, wherein said drive means comprises means for transporting the film by the length of a frame between successive exposures and wherein, in said one position thereof, said coupling member is rotated by said drive means through successive angles of 90 degrees in response to successive transports of the film.

4. A structure as set forth in claim 3, wherein said coupling member is connectable with substantially cube-shaped holders of the type having four equidistant flash bulbs each of which is located in front of a reflector.

5. A structure as set forth in claim 1, wherein said drive means constitutes a film transporting mechanism and wherein said coupling member is rotated through one of said angles in response to manipulation of said film transporting mechanism to advance the film by the length of a frame.

6. A structure as set forth in claim 1, further comprising a flash circuit adapted to be completed only in said one position of said coupling member.

7. A structure as set forth in claim 6, wherein said flash circuit comprises at least one electric contact provided in said housing and movable from a first to a second position in response to movement of said coupling member from said one to said other position thereof, said contact being engageable by a complementary electric contact on a holder which is connected to said coupling member solely in said one position thereof so that the flash circuit cannot be completed when the holder is concealed in said chamber and when the coupling member is moved to said other position subsequent to its separation from a holder.

8. A structure as set forth in claim 1, further comprising resilient means for permanently biasing said coupling member to said one position.

9. A structure as set forth in claim 1, further comprising retaining means for releasably holding the coupling member in said other position.

10. A structure as set forth in claim 9, wherein said retaining means comprises a locking member movable between a locking position in which said coupling member is held against movement from said other position and an idle position, and further comprising a selector movable between at least one first position in which the camera is set for operation in daylight and at least one second position in which the camera is set for operation with flash, and an operative connection between said locking member and said selector for moving said locking member to idle position in response to movement of said selector to second position.

11. A structure as set forth in claim 1, further comprising a flash circuit adapted to be completed solely in said one position of said coupling member and comprising control switch means movable between open and closed positions, and selector means movable between at least one first position in which the camera is set for operation in daylight and at least one second position in which the camera is set for operation with flash, said selector means comprising means for effecting closing of said control switch means in response to movement of said selector means to said second position thereof.

12. In a photographic camera, a housing defining an internal chamber having an open side; an indexing mechanism including a rotary coupling member adapted to be connected with a multiple flash bulb holder, said coupling member being located in said chamber and being movable axially between first and second positions in one of which a holder connected to said coupling member extends from said chamber and in the other of which the holder is retracted into said chamber; retaining means for releasably holding the coupling member in said other position, said retaining means comprising a locking member movable between a locking position in which said coupling member is held against movement from said other position and an idle position; a selector movable between at least one first position in which the camera is set for operation in daylight and at least one second position in which the camera is set for operation with flash; and an operative connection between said locking member and said selector for moving said locking member to idle position in response to movement of said selector to second position, said operative connection comprising a movable motion transmitting member, a spring provided on said motion transmitting member and connected with said locking member, resilient means for permanently biasing said motion transmitting member to a position corresponding to the idle position of said locking member, a follower provided on said motion transmitting member, and a cam on said selector, said cam being arranged to engage said follower in the first position of said selector and to thereby move said motion transmitting member to a position corresponding to the locking position of said locking member.

13. In a photographic camera, a housing defining an internal chamber having an open side; an indexing mechanism including a rotary coupling member adapted to be connected with a multiple flash bulb holder, said coupling member being located in said chamber and being movable axially between first and second positions in one of which a holder connected to said coupling member extends from said chamber and in the other of which the holder is retracted into said camber; blocking means movable between a blocking position to thereby prevent movement of said coupling member to said other position and an unblocking position; and drive means for operating said indexing mechanism to thereby rotate said coupling member through successive angles of equal magnitude, said drive means comprising motion transmitting means for moving said blocking means to unblocking position in response to rotation of said coupling member through one of said angles so that said coupling member is movable to said other position subsequent to rotation thereof.

14. A structure as set forth in claim 13, wherein said drive means is constituted by a film transporting mechanism and wherein said film transporting mechanism is operative to rotate said coupling member through one of said angles in response to advance of the film by the length of a frame.

15. A structure as set forth in claim 13, wherein said drive means is constituted by a shutter cocking mechanism and wherein said coupling member is rotated through one of said angles in response to cocking of the shutter.

16. A structure as set forth in claim 13, further comprising resilient means for permanently biasing said blocking means to blocking position, detent means for releasably holding said blocking means in unblocking position, and trigger means movable from a starting position to a shutter releasing position and comprising disengaging means for disengaging said blocking means from said detent means in response to movement to said shutter releasing position whereby the blocking means automatically returns to said blocking position.

17. A structure as set forth in claim 16, wherein said trigger means is reciprocable between said starting and shutter releasing positions thereof and wherein said disengaging means comprises a pin fixed to said trigger means.

18. A structure as set forth in claim 16, wherein said blocking means comprises a blocking member reciprocably mounted in said housing for movement between said blocking and unblocking positions thereof, said drive means further comprising a rotary member rotatable through successive angles of given magnitude to thereby rotate said coupling member through successive angles of equal magnitude, said motion transmitting means comprising at least one projection provided on said rotary member and arranged to move said blocking member to unblocking position in response to each successive rotation of said rotary member through said given angle.

19. A structure as set forth in claim 18, wherein said projection is arranged to move paid blocking member to unblocking position during a first fraction of rotation of said rotary member through one of said given angles and to move away from engagement with said blocking member during the remaining fraction of such rotation of said rotary member so that, upon completed rotation of said rotary member through one of said given angles, said blocking member is free to return to said blocking position in response to disengagement from said detent means.

References Cited
UNITED STATES PATENTS

| | | | |
|---|---|---|---|
| 3,205,801 | 9/1965 | Peterson | 95—11.5 |
| 3,257,920 | 6/1966 | Greger et al. | 95—11 |
| 3,296,947 | 1/1967 | Engelsmann et al. | 95—11.5 XR |
| 3,353,468 | 11/1967 | Beach | 95—11.5 |
| 3,374,719 | 3/1968 | Horton et al. | 95—11 |
| 3,374,720 | 3/1968 | Harvey | 95—11.5 |

NORTON ANSHER, *Primary Examiner.*

F. L. BRAUN, *Assistant Examiner.*

U.S. Cl. X.R.
95—11; 240—1.3, 37.1